United States Patent [19]

Herndon et al.

[11] Patent Number: 5,314,297
[45] Date of Patent: May 24, 1994

[54] METHOD AND APPARATUS FOR STACK SEPARATOR AND RESTACKER

[76] Inventors: Oma L. Herndon, Box 117, Hatcheechubbee, Ala. 36858; Ruis Russell, Rte. 3, Box 1, Greenville, Ala. 36037; John D. Hite, Jr., 609 Dale Ave., Bradfordwoods, Pa. 15015

[21] Appl. No.: 801,394

[22] Filed: Dec. 2, 1991

[51] Int. Cl.⁵ .................................................. B65H 3/50
[52] U.S. Cl. ............................ 414/796.5; 414/795.7; 414/795.9; 414/796
[58] Field of Search ............... 414/796, 796.1, 796.2, 414/796.7, 796.6, 795.7, 795.9

[56] References Cited

U.S. PATENT DOCUMENTS

| | | | |
|---|---|---|---|
| 3,989,146 | 11/1976 | Lee et al. | |
| 4,067,455 | 1/1978 | Rysti | |
| 4,324,519 | 4/1982 | Moore | 414/788 |
| 4,396,336 | 8/1983 | Malamood | 414/796.1 |
| 4,417,836 | 11/1983 | Schiepe | |
| 4,431,358 | 2/1984 | Jenkner | |
| 4,781,510 | 11/1988 | Smith et al. | 414/795.7 |
| 4,927,321 | 5/1990 | Lucas | 414/788.9 |
| 5,017,085 | 5/1991 | Ishikawa | 414/796 |

FOREIGN PATENT DOCUMENTS

| | | | |
|---|---|---|---|
| 242334 | 9/1989 | Japan | |
| 949751 | 2/1964 | United Kingdom | 414/796 |

Primary Examiner—Michael S. Huppert
Assistant Examiner—Gregory A. Morse
Attorney, Agent, or Firm—Wm. Randall May

[57] ABSTRACT

A stack separator and restacker comprises a conveyor, a splitting bar, a multiplicity of lifting bars and hydraulic controls to operate them. The stack separator and restacker splits a stack or package of rigid elongated members, such as lumber, into smaller stacks or packages by first using the splitting bar to raise one end of the top portion of the stack. The lifting bars then raise the entire top portion of the stack. Once the top portion is completely raised, the bottom portion, now of standardized dimensions, is moved along the conveyor. The top portion is then lowered and is either resplit, restacked onto another stack or package, or is moved along the conveyor for further processing.

12 Claims, 5 Drawing Sheets

METHOD AND APPARATUS FOR STACK SEPARATOR AND RESTACKER

BACKGROUND OF THE INVENTION

I. Field of the Invention

This invention relates generally to a method and apparatus for separating, lifting and reforming stacks or packages of layered objects into stacks of predetermined or standardized dimensions, and more particularly to a new method and apparatus for separating, lifting and restacking packages of lumber into standardized packages.

II. Prior Art and Other Considerations

In modern sawmill and lumber treatment operations, one of the most important manufacturing stages involves the arrangement of elongated timber bodies in stacks suitable for drying or pressurized chemical treating.

Currently lumber treatment mills receive untreated lumber from many different sources. The lumber arrives at the treatment mill in a stack, called a package. No standard size exists for lumber packages resulting in package heights which vary from as few as one layer to more than sixty layers, depending on the dimension of the individual members of the package and the established practice of the particular supply mill furnishing the lumber. To chemically treat the lumber, the treatment mill quite frequently must convert the different sized packages into uniform or standardized packages, the dimensions of which conform to the parameters of the treatment mill's pressurized treatment cylinders and/or market demand.

Prior art methods to date for restacking or repackaging elongated members of a stack of lumber have consisted of either board-by-board manual restacking, which is quite obviously very labor intensive, or the use of conventional lumber stackers wherein the lumber package is broken down into individual boards and then reformed into the desired size package or where the lumber is shifted from its original package one layer at a time and then reformed or restacked into a more desirable sized package.

In a prior art device of this kind, a stacked layer in its full length is shifted perpendicularly off the remainder of the package. The layer is then positioned onto a receiving structure provided near the package, whereupon the layer is taken apart. Such a device requires a very large working area due to the type of mechanical handling necessary for such repackaging technique. In addition, the operation of breaking down the lumber package layer by layer and shifting each layer out of its original package onto a receiving structure is very time consuming.

Another prior art method is to supply individual pieces of lumber to a machine which then forms a package. A device for automatically supplying working machines with individual pieces that are withdrawn from an orderly arranged stack is known from German AS No. 2,323,227. With this device, a package layer is pushed transversely off a package by means of engaging members, and the layer is then taken apart by shifting the individual pieces in their longitudinal direction. A transverse pushing, however, is possible only if the sliding surfaces of the layers in the stack are absolutely smooth. Such a device also requires all the individual pieces of a stack layer to have exactly equal thicknesses and be absolutely even, that is, not warped, bent, or the like. If the lumber in the package is not absolutely smooth, the use of a plurality of regularly spaced elements, called stickers, is required to be provided transversely between every two stack layers. Since such ideal conditions rarely occur, in practice, a transverse shifting of a stack layer is possible only when a stack with spacer elements is used.

Such a device for separating and shifting elongated members of a stack of members is shown in U.S. Pat. No. 4,417,836 to Schiepe. This device is designed to separate and laterally shift one layer of a stack of layers for repositioning and, if necessary, for further separation of the members of the layer. Restacking or reforming the layers without lateral shifting is not possible with this device nor can the device shift or reposition more than one layer of members at a time.

Another prior art device relates to an apparatus for breaking up or subdividing stacks of superimposed or overlapping panels, particularly wooden or composition boards or sheets of plywood, for feeding into the range of a rotary saw blade in a power saw or similar tool. In operation, a lifting device carries a stack of overlapping panels and cooperates with a transfer unit to supply a desired number of overlapping panels, or discrete panels, into the range of the subdividing or severing tool.

In a machine tool of the above outlined character, it is necessary to control the extent of upward movement of the lifting device in order to ensure that a requisite number of panels will be placed into the range of the transfer unit, and it is further necessary to regulate the extent of back-and-forth movement of the transfer unit in order to reduce to a minimum the length of strokes of the transfer unit. As a rule such operations are controlled by an attendant who stands or sits adjacent to a control panel with a variety of pushbuttons, knobs, levers or analogous actuating elements for the corresponding prime movers of the machine tool. In other words, it is necessary to monitor the number of panels which have been lifted into the path of movement of the transfer unit so that the latter can thereupon perform a working stroke and transfer the selected number of panels onto the table or other suitable work support of the machine tool.

The above outlined operations must be carried out by a conscientious operator in order to avoid damage to the workpieces and/or to parts of the machine tool, or injury to attendants. Furthermore, the work is time consuming if the operator is not experienced and very familiar with the operation of the controls because he or she is likely to cause the transfer unit to perform strokes of excessive length with resultant lengthening of intervals between successive severing operations. U.S. Pat. No. 4,431,358 to Jenkner attempts to improve upon the safety features of such a machine tool and to provide for more automation of same. However, while this prior art device has some limited capability for separating stacks of panels, the device is designed for specific use with a power saw or other similar machine tool and does not attempt to address the needs or objects addressed by the present invention.

At the present time, machines which have the capability to form or restack packages of elongated members are very complicated and intricate in their operation and design and typically require the use of several human operators. These prior art machines are also limited in their ability to quickly separate and restack packages of elongated members.

Inasmuch as conventional apparatus of the above type is very expensive to construct and inasmuch as proper operation of these prior art machines require at least two or more individuals, the operating costs for such conventional installations remain undesirably high.

For the above reasons, a considerable effort has been made over a long period of time to develop a method and plant according to which only a single individual would be required to perform all of the operations in connection with separating, lifting and reforming stacks of elongated members, such as lumber, into standardized or conforming packages.

SUMMARY OF THE INVENTION

In view of the foregoing, it is an object of the present invention to provide a method and apparatus for efficiently separating, lifting and restacking packages or stacks of rigid elongated members, such as packages of lumber, into predetermined or standardized packages.

An advantage of the present invention is the provision of method and apparatus wherein a single operator can separate, lift and restack a package or stack of rigid elongated members.

An advantage of the present invention is the provision of method and apparatus for speedily separating, lifting and restacking packages or stacks of rigid elongated members.

Another advantage of the present invention is the provision of method and apparatus for facilitating a desired size of package.

A further advantage of the present invention is the provision of a method and apparatus for separating, lifting and restacking a package of lumber, or other similarly layered packages or stacks of rigid elongated members, which does not require all of the package members to be the exact same size or to be absolutely smooth.

Another advantage of the present invention is the provision of method and apparatus for facilitating the removal of stabilizing strips or spacers commonly placed by supply mills within or between the layers of a package or stack of lumber.

In accordance with features of this invention, a stack separator and restacker comprises a conveyor means, a splitter means, a support means, a guide means, a control means, and an engine means.

In use, a stack or package of lumber, or other stack containing similarly layered materials, is fed into the stack separator and restacker by the conveyor means and is aligned, held and stabilized by the alignment means. The control means operates the splitter means through the use of the guide means. The control means, utilizing the guide means, moves the lifting means into position such that the splitter means can slide between two layers of boards in the lumber package. The engine means, controlled and operated by the control means, pushes the splitter means through one end of the package of lumber. The splitter means is then lifted vertically by the engine means. As the splitter means moves upward, one end of the top portion of the lumber package being split is lifted thereby creating a gap between the bottom portion and the top portion of the package. The support means, driven by the engine means, then slides under the uplifted portion of the package. The engine means then lifts the support means, thereby completely raising the top portion of the package above the bottom portion of the package. The conveyor means, also driven by the engine means, then moves the lower portion of the package and the upper portion is lowered, either to be split again or to complete another package, as necessary.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
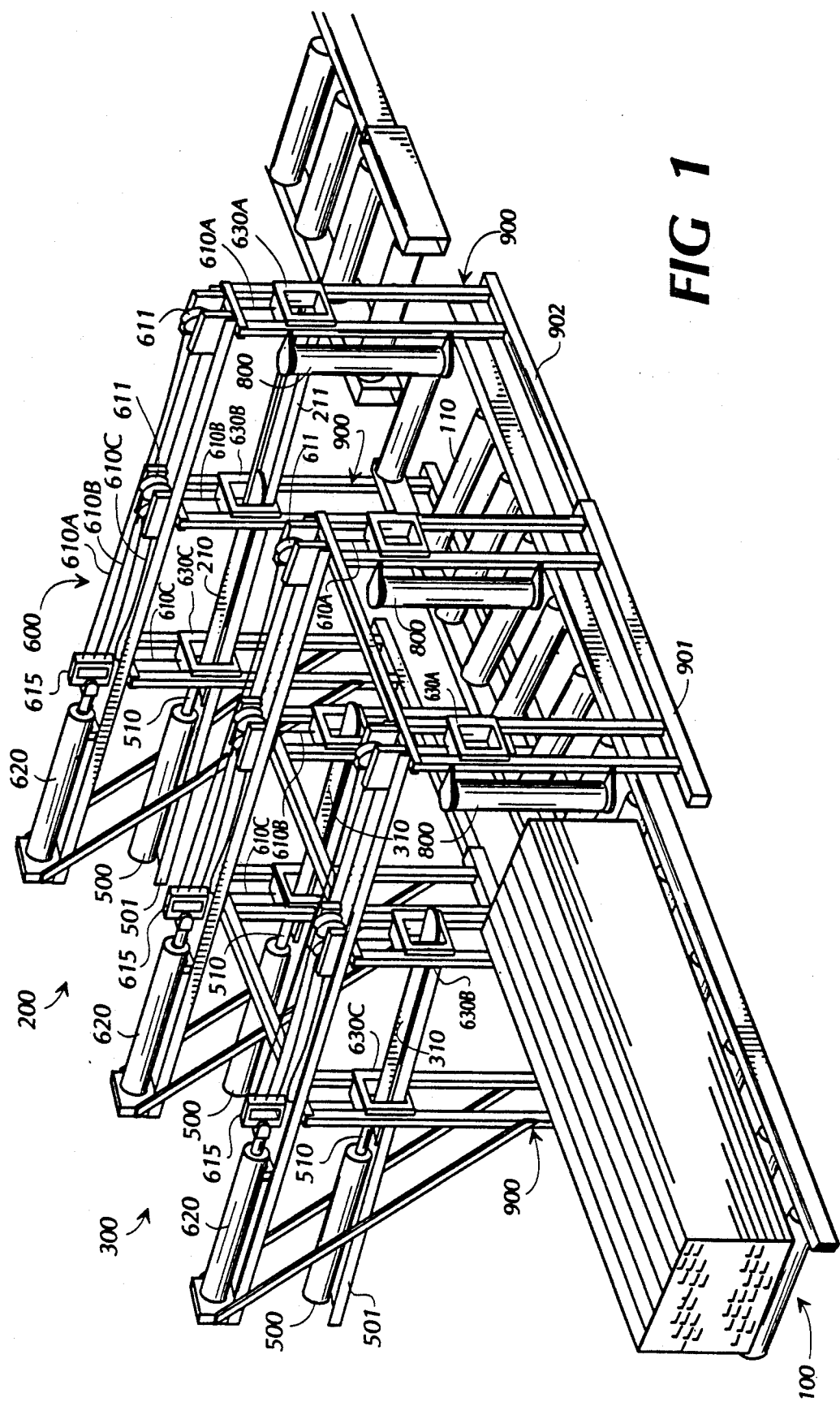
FIG. 1 is a perspective view of a first preferred embodiment of the invention.

The stack separator and restacker of FIG. 1 comprises a conveyor assembly 100, a splitter assembly 200, a support assembly 300, a hydraulic control assembly 400 (not shown in FIG. 1), and a frame 900.

Figure 2:
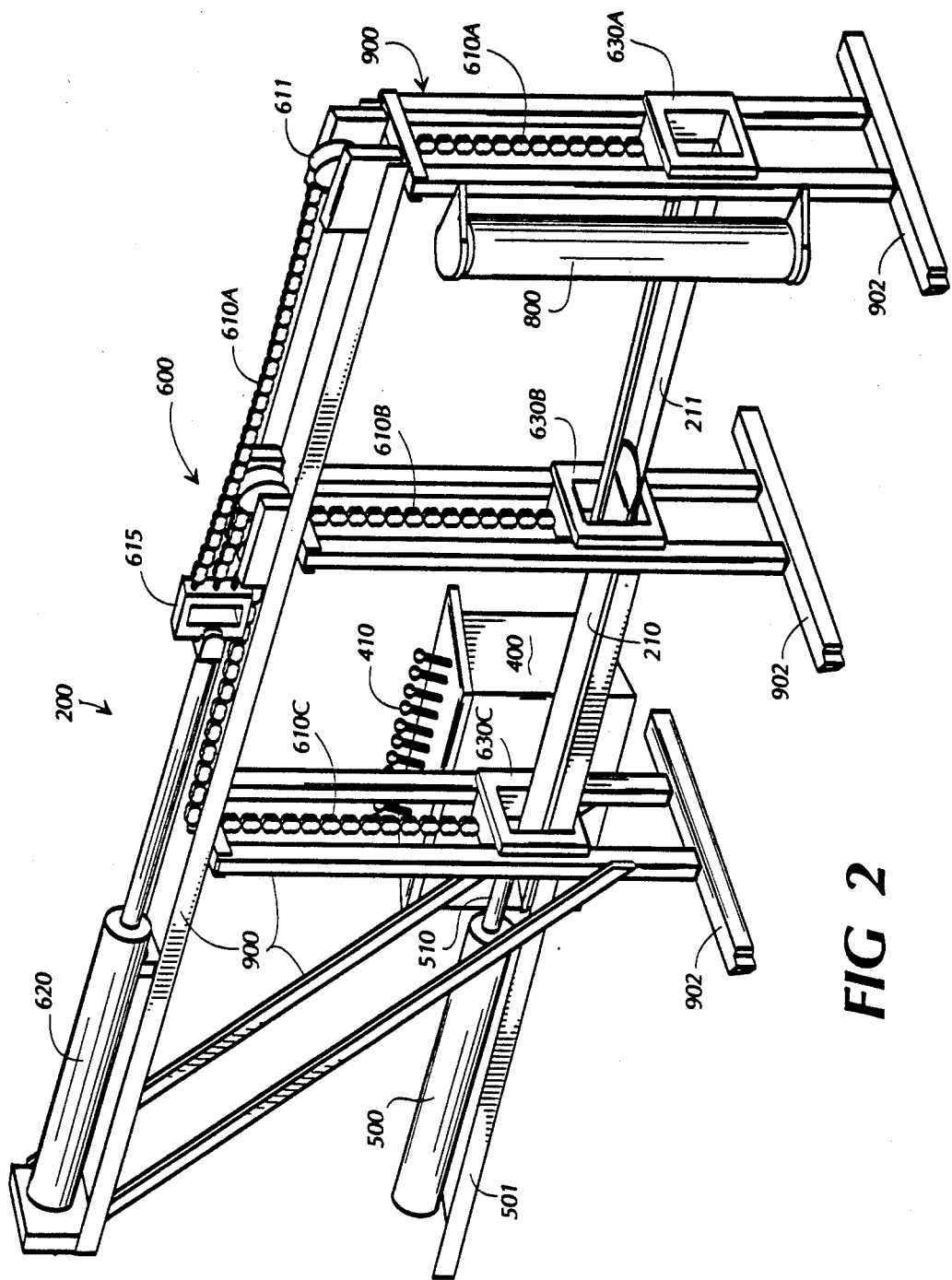
FIG. 2 is a perspective view, partially sectioned, of the splitter assembly, showing the splitter lifting assembly and the hydraulic control assembly of the embodiment of FIG. 1.
Figure 4:
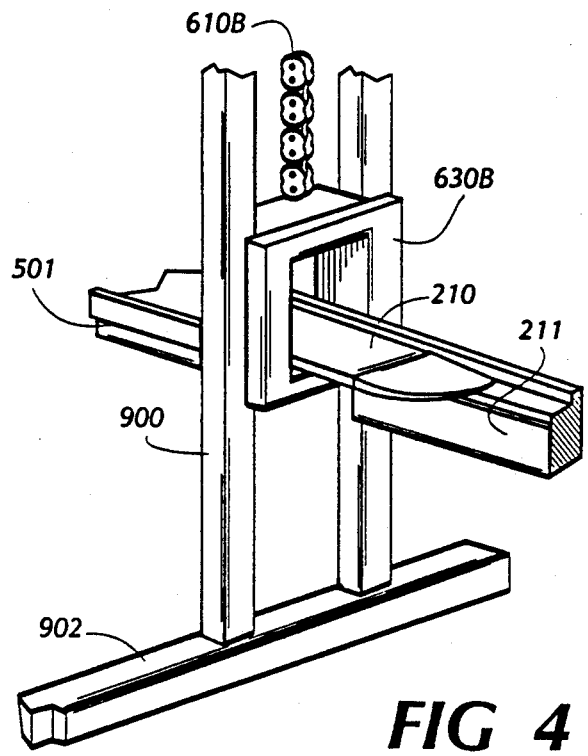
FIG. 4 is a perspective view, partially sectioned, of the splitter bar and supporting structure of the embodiment of FIG. 1.
Figure 5:
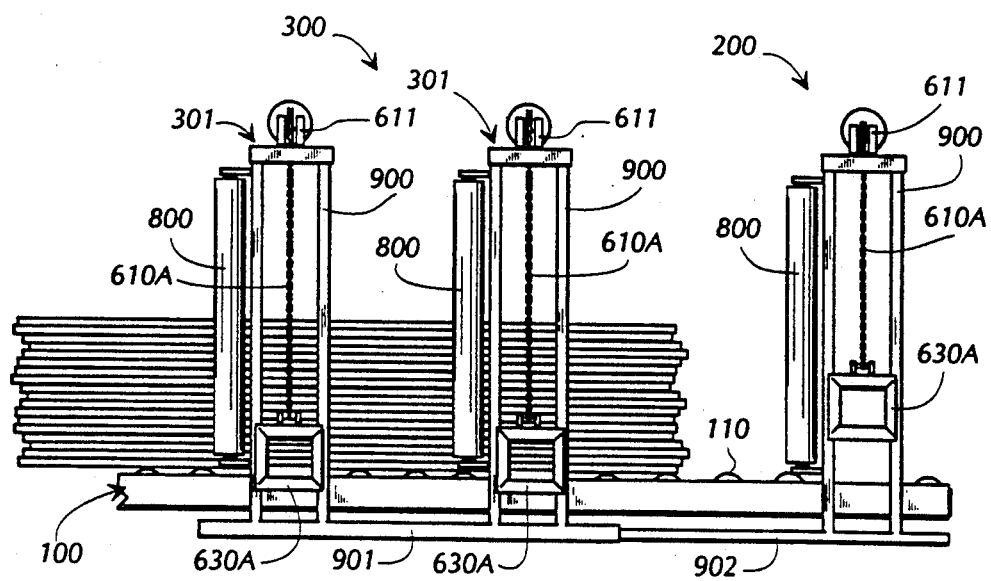
FIG. 5 is a right side view of the embodiment of FIG. 1 showing a package of lumber entering the invention on the roller conveyor.
Figure 6:
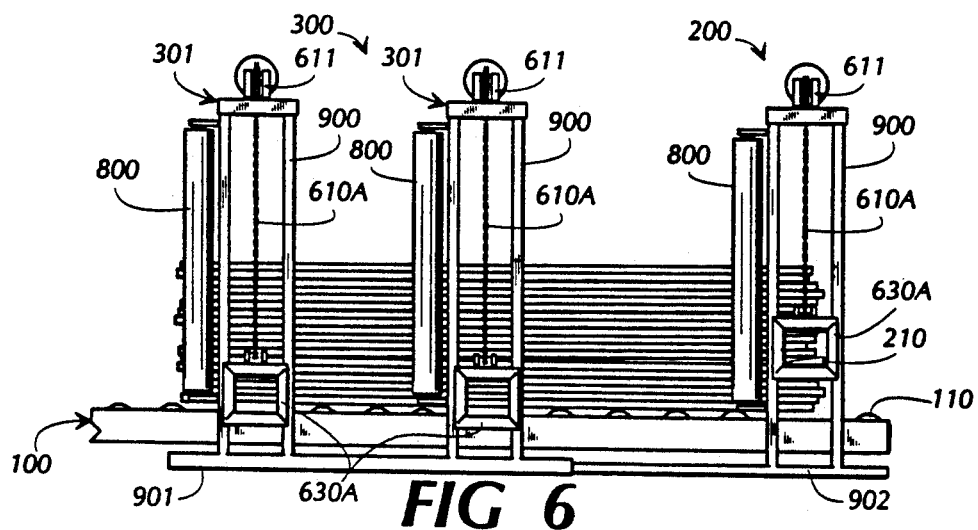
FIG. 6 is a right side view of the embodiment of FIG. 1 showing a package of lumber fully situated in the invention with the splitter bar fully extended through the front section of the package.
Figure 7:
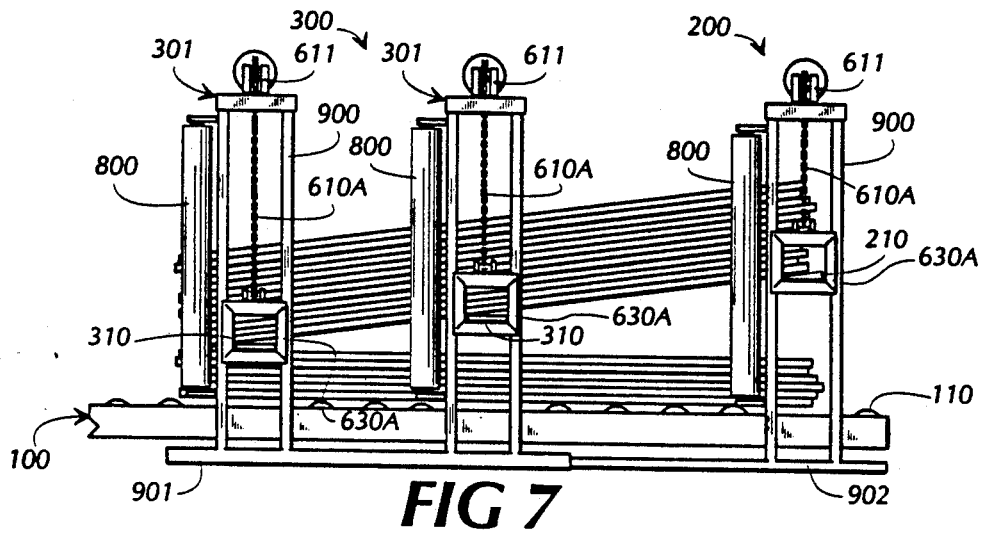
FIG. 7 is a right side view of the embodiment of FIG. 1 showing the support assembly engaging a package of lumber which has been separated and partially lifted by the splitter assembly.

The splitter assembly 200, as shown in FIG. 2, comprises a splitter bar 210, a splitter bar hydraulic assembly 500, and a splitter lifting assembly 600. The splitter bar 210 is attached at one end to the piston rod 510 of the splitter bar hydraulic assembly 500. As shown in FIG. 4, the splitter bar 210 is tapered, much as a knife blade, with the "cutting side" of the bar facing toward incoming packages of lumber or other materials to be split. The splitter bar 210 slidably rests on an "L" shaped support/guide/stop 211 which is securely attached between and to splitter bar lift guides 630 A and B. The support/guide/stop 211 width is such that the tapered portion of the splitter bar 210 extends beyond the width of said support/guide/stop 211. The splitter bar hydraulic assembly 500 is typical of all hydraulic assemblies used in connection with the invention and is supported by a railing 501. Said railing 501 is firmly and securely attached between and to splitter bar lift guides 630 C and B as shown in FIG. 2. The splitter lifting assembly 600 is typical of all lifting assemblies used in connection with the invention and comprises three lifting chains 610 A, B and C, a rectangular-shaped connection harness 615, a hydraulic lift assembly 620, and three (3) splitter bar lift guides 630 A, B and C. The lifting chains 610 A, B and C are securely attached to the splitter bar lift guides 630 A, B and C as shown and, where caused to move at right angles, operate through the use of pulleys 611. The splitter bar lift guides 630 A, B and C are typical of all bar guides used in connection with the invention and are slidably engaged with frame 900 at the locations shown in the figures.

Figure 3:
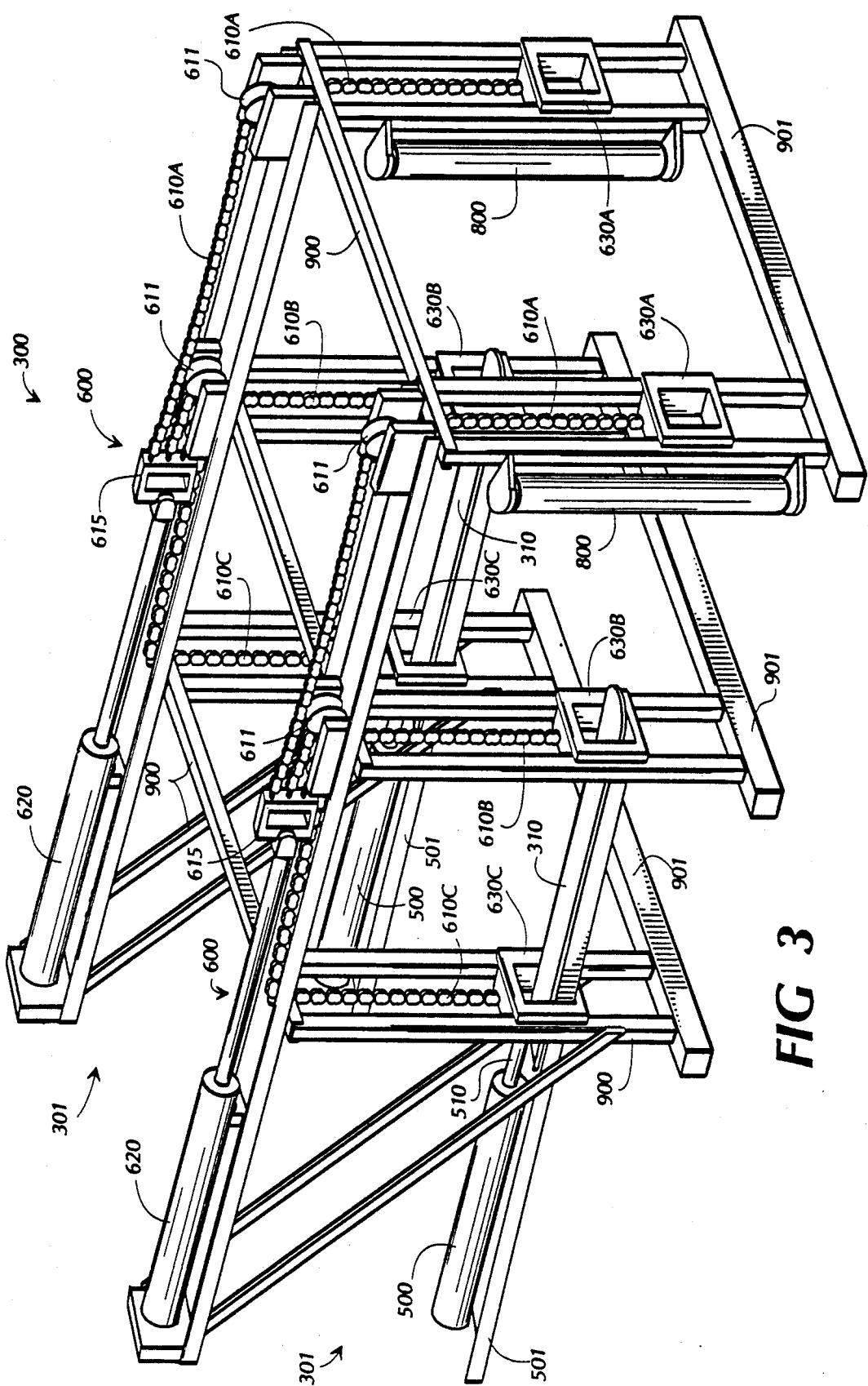
FIG. 3 is a perspective view, partially sectioned, of the support assembly of the embodiment of FIG. 1.

The support assembly 300, as shown in FIG. 3, comprises a multiplicity of one or more support bar assemblies 301. Each support bar assembly 301 comprises a support bar 310, a support bar hydraulic assembly 500, and a support lifting assembly 600.

The hydraulic control assembly 400, as shown in FIG. 2, comprises a control panel 410 and a hydraulic control network 420 (not shown). The hydraulic control network 420 comprises a multiplicity of hydraulic control hoses which are operably attached to the various hydraulic assemblies 500 and 620, alignment rams 810, conveyor assembly 100 and frame 900.

The conveyor assembly 100 comprises a multiplicity of horizontal rollers 110 which can be hydraulically engaged in a forward or backward rotation as necessary for the advancement or retraction of a package of lumber.

The frame 900 comprises rigid members, such as structural steel, and further comprises a support assembly base 901 and a splitter assembly base 902. The support assembly base 901 slidably engages the splitter assembly base 902 thereby allowing for horizontal movement of the entire support assembly structure 300 as necessary to accommodate differing lengths of packages. Attached to frame 900 are hydraulically controlled alignment rams 810 (not shown in drawings). These rams 810 are located between the splitter bar 210 and the support bars 310 and, when engaged, forces a package of lumber into alignment over and against roller guides 800.

In operation, as shown in sequential operation FIGS. 5, 6, 7 and 8, a package of lumber is loaded onto the conveyor assembly 100. The operator advances the package along the conveyor assembly 100 into the package separator and restacker structure 300 and 200 until the package rests firmly against or near support-/guide/stop 211. The roller guides 800 are provided for proper alignment of the right side of the package as the operator advances the package along the conveyor assembly 100 and enters frame 900. Once the package has come to rest against support/guide/stop 211, the alignment rams 810 are engaged. Said rams 810 operate to align, hold and stabilize the package during the splitting operation of the splitter assembly 200. Using the control panel 410 of the hydraulic control assembly 400, the operator opens the hydraulic control network 420 such that it opens the splitter bar hydraulic assembly 500 of the splitter assembly 200. As the splitter bar hydraulic assembly 500 opens, it pushes the splitter bar 210 through splitter lift guide 630 B, between two layers of boards at the leading end of the package, and finally through splitter lift guide 630 A. When the splitter bar hydraulic assembly 500 is fully opened, the operator, through the control panel 410, engages the lifting assembly 600 associated with the splitter assembly 200. When the splitter lifting assembly 600 is engaged, the hydraulic lift assembly 620 of splitter lifting assembly 600 closes, thereby pulling on the three lifting chains 610 A, B and C associated with said splitter lifting assembly 600. The three lifting chains 610 A, B and C simultaneously lift the three splitter lift guides 630 A, B and C of splitter lifting assembly 600 thereby lifting the splitter bar hydraulic assembly 500 and splitter bar 210. As the splitter bar 210 is lifted, the front end of the top portion of the package above the splitter bar 210 is lifted, creating a gap between the top and bottom sections of the package.

Figure 8:
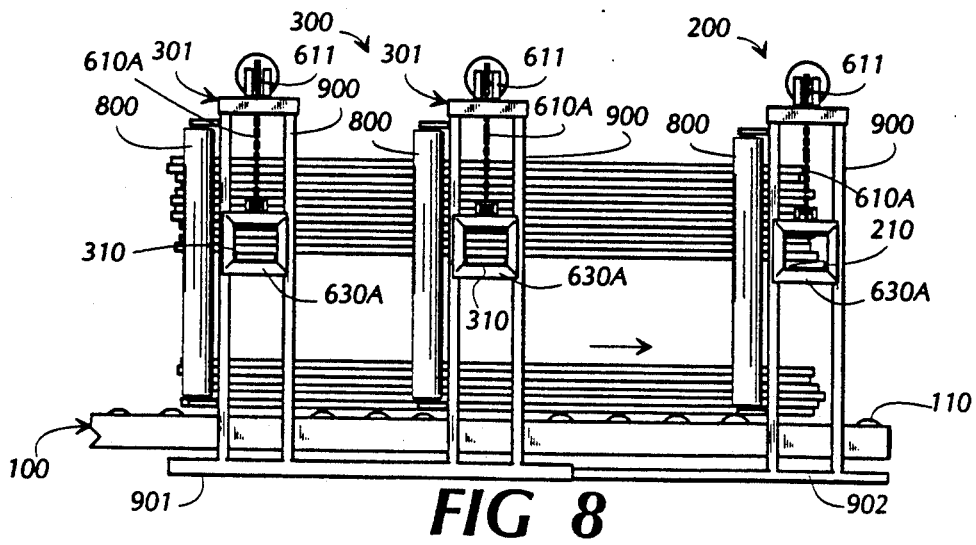
FIG. 8 is a right side view of the embodiment of FIG. 1 showing a package of lumber completely separated and lifted by the splitter and support assemblies.

Once the top portion of the package is partially lifted, the operator engages the support assembly 300. The support assembly 300 is engaged by the operator, depending on the length of boards to be supported, activating one or more of the support bar assemblies 301 using the control panel 410. When a support bar assembly 301 is engaged, the hydraulic assembly 500, associated with that particular support bar assembly 301, is opened. As the hydraulic assembly 500 is opened it pushes the support bar 310 through support lift guide 630 B, through the gap in the package created by the action of the splitter assembly 200, and through support lift guide 630 A located on the opposite side of the package. Once the support bar hydraulic assembly 500 is fully opened, the support bar hydraulic assembly 500 and the support bar 310 is lifted in the same way as the splitter assembly 200 was lifted, but using the hydraulic lift assembly 620 of support assembly 300. The top portion of the package is now fully separated from the lower portion of the package as can be seen in FIG. 8.

The lower portion of the package is then moved along the conveyor assembly 100, and the upper portion of the package is lowered. The upper portion of the package is lowered by disengaging the lifting assemblies 600 of splitter assembly 200 and support assembly 300. As the lifting assemblies 600 are disengaged, they open, thereby lowering the lifting chains 610 A, B and C associated with each assembly. This action lowers the upper portion of the package down onto the conveyor 100 or onto another package, thereby enabling the new package to be split once again or to be advanced along said conveyor 100.

While the invention has been particularly shown and described with reference to the preferred embodiments thereof, it will be understood by those skilled in the art that various alterations in form and detail may be made therein without departing from the spirit and scope on the invention.

The embodiments of the invention in which an exclusive property or privilege is claimed are defined as follows:

1. An apparatus for lateral separation, lift and reformation of stacks of board lumber or stacks containing multi-member layers of other rigid elongated objects, said apparatus comprising:
   an adjustable frame comprising:
      a splitter assembly frame, and
      a support assembly frame which is slidably mounted to said splitter assembly frame;
   a partially motorized conveyor means for advancing a stack of lumber or other rigid elongated objects toward and into said adjustable frame;
   an alignment means for aligning, holding and stabilizing said stack of lumber or other elongated objects prior to and during the separation and lifting of one or more layers of said stack;
   a tapered splitter means operably mounted to said splitter assembly frame for facilitation of the initial lateral separation and vertical lifting of one end of one or more layers of said stack;

a support means, operably mounted to said support assembly frame and spaceably and adjustably positioned away from said splitter assembly frame, for assisting in the lifting and lateral support of one or more layers of said stack after said splitter means has separated and partially lifted one end of said separated layer or layers of said stack;

a pressurized fluid control means for coordination and control of said conveyor means, said alignment means, said splitter means, and said support means; and, an engine means for providing pressurized fluid through said control means to said conveyor means, said alignment means, said splitter means, and said support means.

2. The apparatus of claim 1, wherein said partially motorized conveyor means comprises a multiplicity of horizontal rollers, one or more of which are mechanically rotated through the operation of said control means and said engine means.

3. The apparatus of claim 1, wherein said alignment means is mounted to said adjustable frame and comprises:

one or more alignment rams for vertical and lateral alignment of the layers of said stack after said stack has been caused to advance into said adjustable frame, and for holding and stabilizing said stack during the process of separating and lifting one or more layers of said stack; and, one or more vertical roller guides for guiding said stack as said stack is advanced by said conveyor means into said frame and for lateral and vertical alignment of at least one side of said stack.

4. The apparatus of claim 1, wherein said tapered splitter means comprises an assembly comprising:

a rigid elongated blade having a tapered end for facilitating the horizontal insertion of said blade between layers of individual members of said stack;

means for forcing or driving said tapered splitter blade between and laterally through, two layers of said stack thereby separating and dividing said layers;

a support/guide rail or track for supporting and slidably guiding said splitter blade as said blade is forced through and between two layers of said stack;

means for vertically positioning said splitter blade for initial insertion of said blade between said layers of said stack and for lifting the separated portion of said stack; and, a pair of synchronous lift guides which slidably receive and support said splitter blade and are slidably and operatively mounted to the splitter assembly frame and are operably attached to said means for positioning and lifting said blade.

5. The apparatus of claim 4, wherein said support/guide rail comprises a rigid, horizontal, "L" shaped bar which is permanently and securely attached to and between said lift guides, said bar being slightly narrower than said splitter blade.

6. The apparatus of claim 4, wherein said means for vertically positioning and lifting said splitter blade comprises:

a set of lifting chains, each chain being securely and operably attached at one end to one of said lift guides;

a connection harness for connection of said set of lifting chains to said lifting means and for simultaneous and synchronous movement of said lifting chains;

means for mechanical movement of said lifting chains; and, a set of pulleys for facilitation of said mechanical movement of said lifting chains through angular directions.

7. The apparatus of claim 4, wherein said pair of synchronous lift guides comprise square or rectangular shaped rigid windows for slidably receiving and engaging said splitter blade.

8. The apparatus of claim 1, wherein said support means comprises an assembly comprising:

a rigid, elongated, horizontally positioned, support bar;

means for driving said support bar in a lateral direction across and between separated layers of said stack;

means for vertically positioning and lifting said support bar; and, a pair of synchronous lift guides which slidably receive and support said support bar and are slidably and operably mounted to the support assembly frame and are operably attached to said means for positioning and lifting said support bar.

9. The apparatus of claim 8, wherein said support means comprises one or more of said assemblies.

10. The apparatus of claim 8, wherein said means for vertically positioning and lifting said support bar comprises:

a set of lifting chains, each chain being securely and operably attached at one end to one of said lift guides;

a connection harness for connection of said set of lifting chains to said lifting means and for the simultaneous and synchronous movement of said lifting chains;

means for mechanical movement of said lifting chains; and, a set of pulleys for facilitation of said mechanical movement of said chains through angular directions.

11. The apparatus of claim 8, wherein said lift guides comprise square or rectangular shaped rigid windows for slidably receiving and engaging said support bar.

12. A method of operating a stack separator and re-stacker comprising:

loading a stack of layered elongated objects onto a conveyor assembly;

advancing said stack along said conveyor assembly to a point within a framework;

engaging an alignment means for aligning, holding and stabilizing said stack within said framework, engaging a guiding means to guide a tapered splitter blade into position for horizontal insertion between two layers of one end of said stack;

sliding said splitter blade horizontally between said layers;

engaging a lifting means to vertically lift said splitter blade thereby creating a gap between a top portion of said stack and a bottom portion of said stack;

engaging a guiding means to guide one or more support bars into position for horizontal insertion within the gap created by the lifting of said splitter blade;

sliding said support bar or bars through said gap and under said top portion of said stack;

engaging a lifting means to vertically lift said support bar or bars thereby completing the separation of said top portion of said stack from said bottom portion;

advancing said bottom portion of said stack along said conveyor assembly;

simultaneously lowering said splitter blade and support bar or bars thereby lowering the separated upper portion of said stack onto said conveyor assembly or onto another stack of layered elongated objects;

retracting said splitter blade and support bar or bars from the bottom of said separated portion of said stack;

disengaging said alignment means; and, repeating the above steps for reseparation and/or relifting of said upper portion of said stack; or, advancing said upper portion of said stack along said conveyor assembly as necessary.

* * * * *